United States Patent
Lim et al.

(10) Patent No.: US 10,346,680 B2
(45) Date of Patent: Jul. 9, 2019

(54) IMAGING APPARATUS AND CONTROL METHOD FOR DETERMINING A POSTURE OF AN OBJECT

(71) Applicants: SAMSUNG ELECTRONICS CO., LTD., Suwon-si (KR); POSTECH ACADEMY-INDUSTRY FOUNDATION, Pohang-si (KR)

(72) Inventors: Tae-gyu Lim, Seoul (KR); Bo-hyung Han, Pohang-si (KR); Joon-hee Han, Pohang-si (KR); Seung-hoon Hong, Pohang-si (KR); Han-tak Kwak, Suwon-si (KR); Sung-bum Park, Seongnam-si (KR); Woo-sung Shim, Suwon-si (KR)

(73) Assignees: SAMSUNG ELECTRONICS CO., LTD., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 568 days.

(21) Appl. No.: 14/249,466

(22) Filed: Apr. 10, 2014

(65) Prior Publication Data

US 2014/0307075 A1    Oct. 16, 2014

Related U.S. Application Data

(60) Provisional application No. 61/811,317, filed on Apr. 12, 2013.

(30) Foreign Application Priority Data

Jul. 24, 2013 (KR) .................. 10-2013-0087089

(51) Int. Cl.
*G06K 9/00* (2006.01)

(52) U.S. Cl.
CPC .............................. *G06K 9/00369* (2013.01)

(58) Field of Classification Search
CPC .................................................. G06K 9/00369
See application file for complete search history.

(56) References Cited

U.S. PATENT DOCUMENTS

| 5,604,820 A * | 2/1997 | Ono .................. G06K 9/00268 |
| | | 382/157 |
| 2004/0120581 A1* | 6/2004 | Ozer ................. G06K 9/00335 |
| | | 382/224 |
| 2004/0141636 A1* | 7/2004 | Liang .................... A61B 5/1113 |
| | | 382/110 |

(Continued)

*Primary Examiner* — Mohammed Jebari
(74) *Attorney, Agent, or Firm* — Sughrue Mion, PLLC

(57) ABSTRACT

An imaging apparatus is provided. The imaging apparatus includes an imager configured to record an external image, a region determiner configured to divide a recorded previous image frame and a recorded current image frame into pluralities of regions, calculate a moving direction and a distance of each of the plurality of regions in the current image frame corresponding to each of the plurality of regions in the previous image frame, and determine a background and an object by applying a preset background model and object model based on the calculated moving direction and distance, and a posture determiner configured to determine body parts of the determined object based on a body part model, and determine a posture of the object by combining the determined body parts.

17 Claims, 11 Drawing Sheets

(56) References Cited

U.S. PATENT DOCUMENTS

| | | | |
|---|---|---|---|
| 2006/0269145 A1* | 11/2006 | Roberts | G06K 9/00369 382/228 |
| 2008/0143837 A1* | 6/2008 | Okamoto | H04N 17/00 348/180 |
| 2009/0322888 A1* | 12/2009 | Wuerz-Wessel | G06F 3/017 348/207.11 |
| 2010/0303289 A1* | 12/2010 | Polzin | A63F 13/213 382/103 |
| 2012/0016960 A1* | 1/2012 | Gelb | G06Q 10/10 709/217 |
| 2012/0201417 A1* | 8/2012 | Park | G06F 3/017 382/103 |
| 2012/0242800 A1* | 9/2012 | Ionescu | G06F 3/017 348/46 |
| 2013/0342636 A1* | 12/2013 | Tian | G06F 3/017 348/14.08 |

* cited by examiner

FIG. 3
(a)
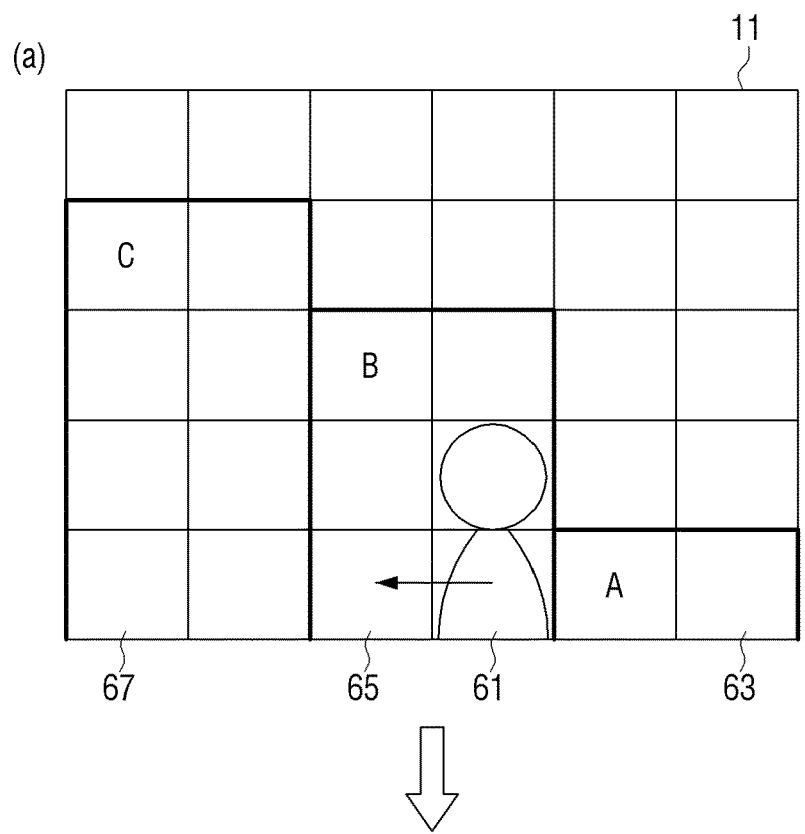
(b)
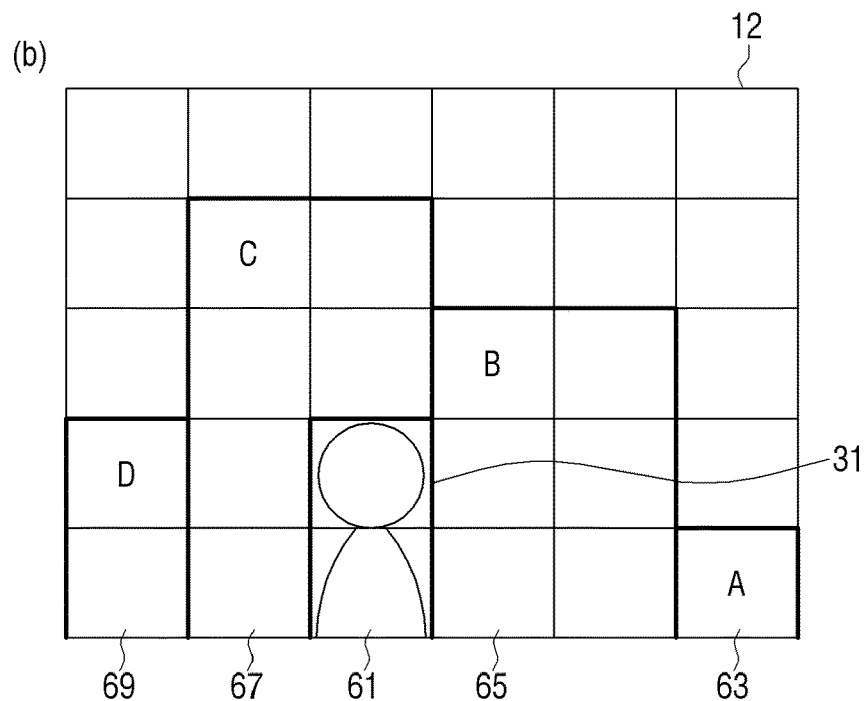

FIG. 5
(a)
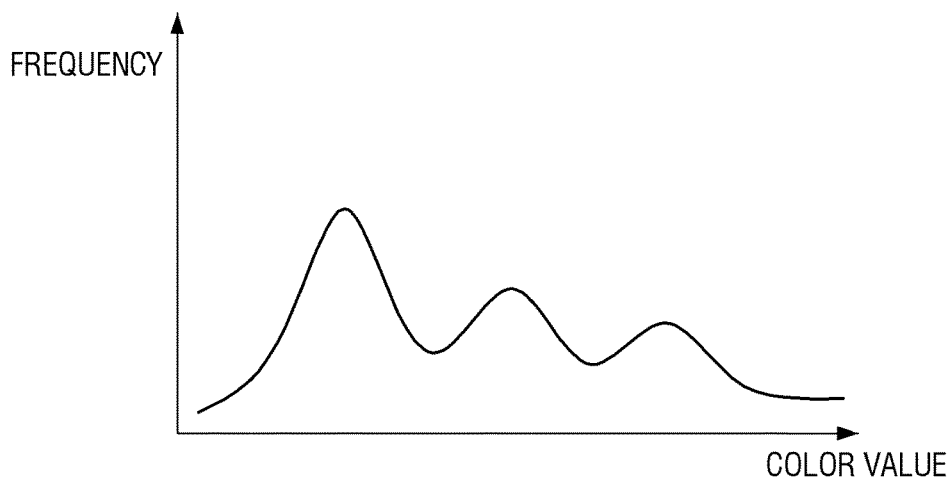
(b)
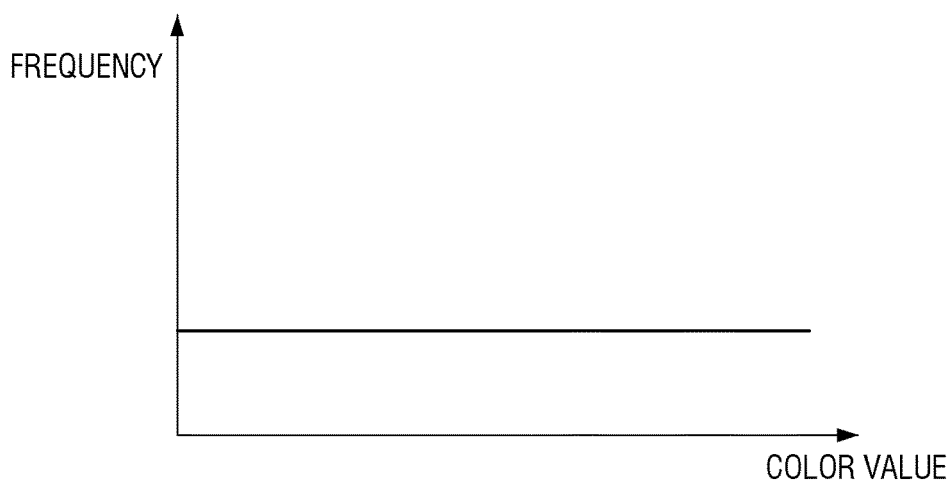
(c)
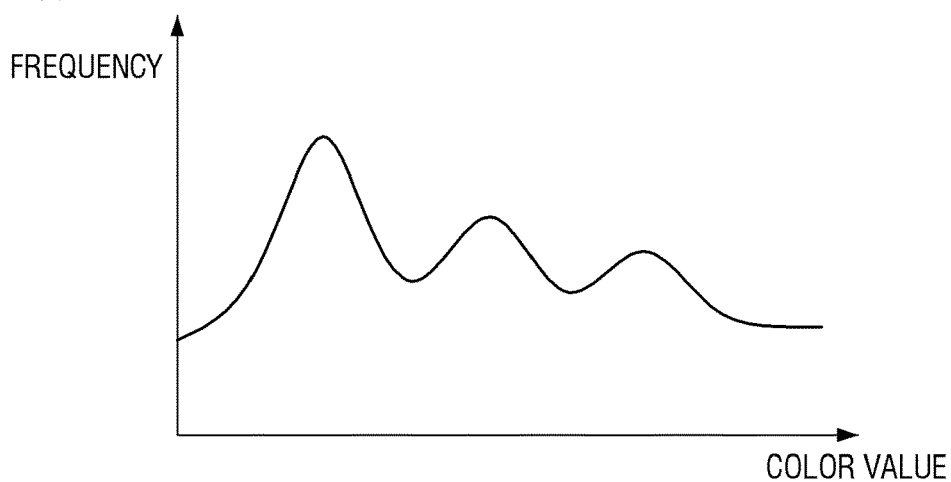

FIG. 7
(a)
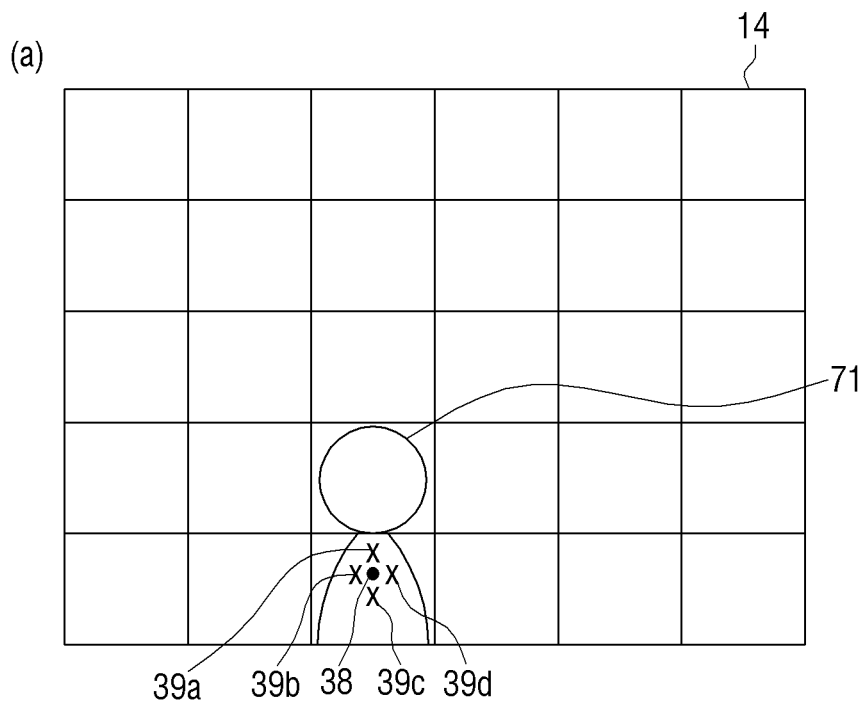
(b)
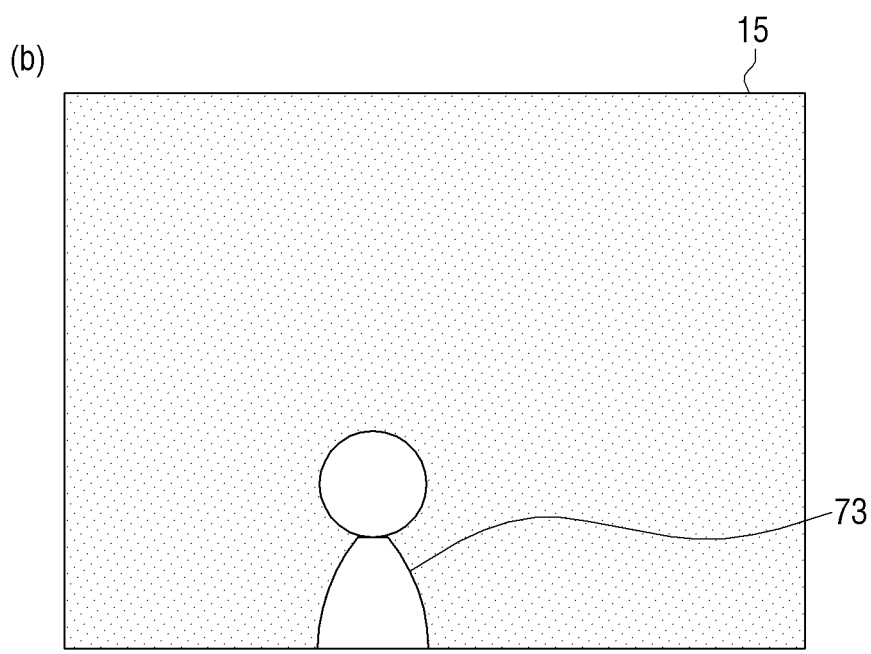

FIG. 8
(a)
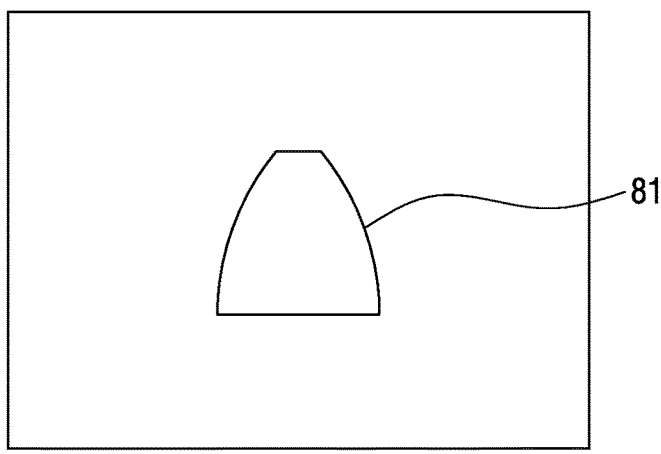
(b)
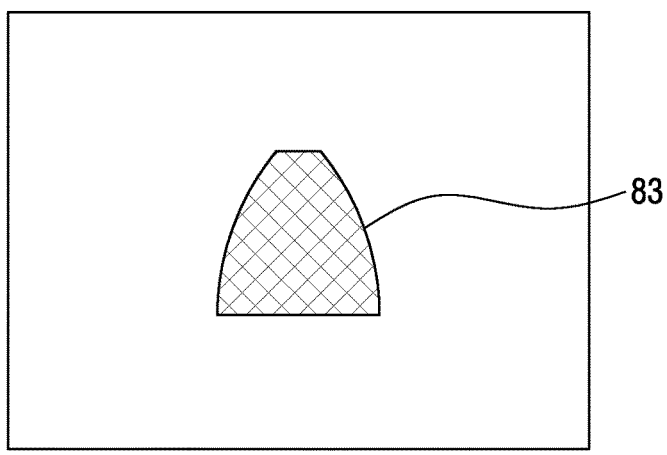
(c)
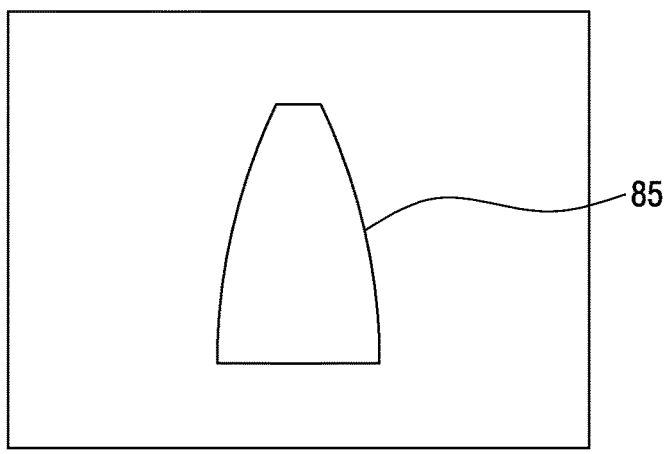

FIG. 11
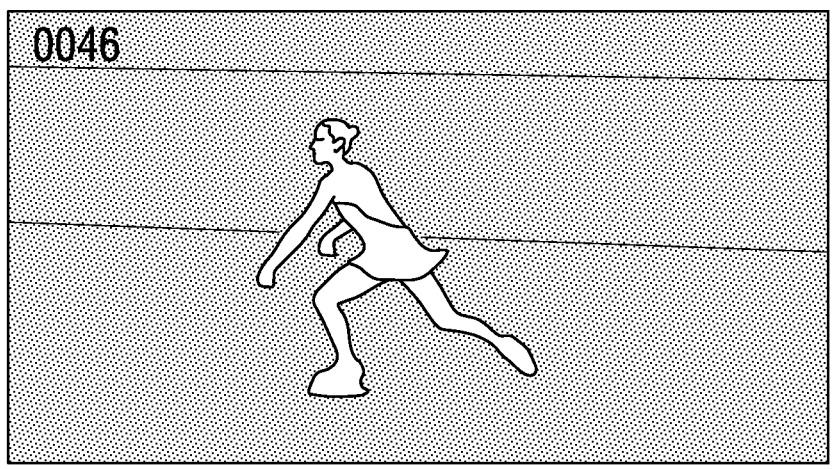
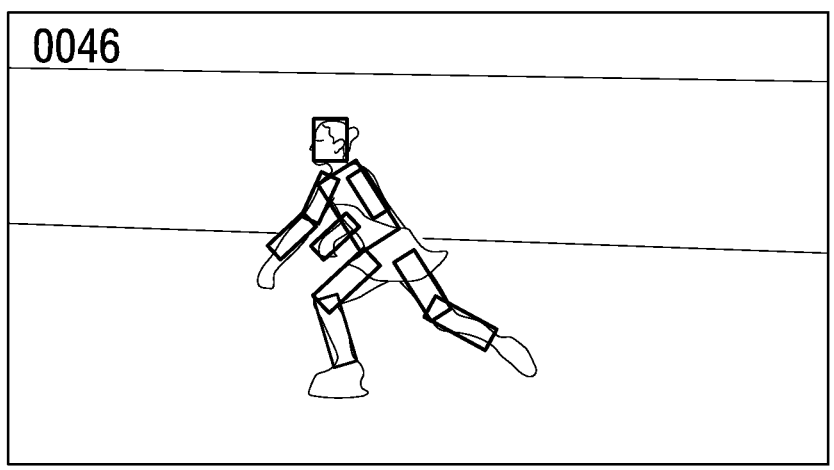

IMAGING APPARATUS AND CONTROL METHOD FOR DETERMINING A POSTURE OF AN OBJECT

CROSS-REFERENCE TO RELATED APPLICATION

This application claims priority from U.S. Provisional Patent Application No. 61/811,317, filed on Apr. 12, 2013, in the United States Patent and Trademark Office, and Korean Patent Application No. 10-2013-0087089, filed on Jul. 24, 2013, in the Korean Intellectual Property Office, the disclosures of which are incorporated herein by reference in their entirety.

BACKGROUND

1. Field

Apparatuses and methods consistent with exemplary embodiments relate to an imaging apparatus and a control method thereof, and more particularly, to an imaging apparatus for dividing an object and a background from an image and determining a posture of the object, and a control method thereof.

2. Description of the Related Art p In the related art, a user inputs a command to an electronic apparatus using a button or a remote controller provided with the electronic apparatus. Recently, with development of electronic technology, various methods of inputting a command to an electronic apparatus have been developed. One example is a method of recognizing a gesture of a user to input a command. Further, a method of recognizing a posture of a user to perform an additional function has been developed. To this end, there is a need for technology to accurately recognize a gesture or a posture of a user from an input image.

In the related art, a posture of an object included in an image is recognized on the assumption that a background image of the object is fixed. At this time, since a background region of an image frame is almost motionless, and a motion of the object is active, the electronic apparatus recognizes the object and determines a posture of the object through a method of generating mask information for the background region previously and matching the mask information with the input image frame.

However, in the method of the related art, when the background region changes, there is a high possibility of an error, and when the camera moves, the background region of the image frame changes, and thus an application range is limited.

Therefore, there is a need for technology for dividing a background and an object in various environments and accurately determining a posture of the object.

SUMMARY

One or more exemplary embodiments may address the above disadvantages and other disadvantages not described above. However, it is understood that one or more exemplary embodiment are not required to address the disadvantages described above, and may not address any of the problems described above.

One or more exemplary embodiments relate to an imaging apparatus which divides a background and an object in various environments and accurately determines a posture of the object, and a control method thereof.

According to an aspect of an exemplary embodiment, there is provided an imaging apparatus. The imaging apparatus may include: an imaging unit configured to record an external image; a region determination unit configured to divide a recorded previous image frame and a recorded current image frame into pluralities of regions, calculate a moving direction and a distance of each of the plurality of regions in the current image frame corresponding to each of the plurality of regions in the previous image frame, and determine a background and an object by applying a preset background model and object model based on the calculated moving direction and distance; and a posture determination unit configured to determine body parts of the determined object based on a body part model, and determine a posture of the object by combining the determined body parts.

The region determination unit may calculate a moving direction and a distance of each pixel in each region of the current image frame corresponding to each pixel of each region of the previous image frame, and calculate the moving direction and the distance of each region of the current image frame by averaging the calculated moving direction and distance of each pixel.

The region determination unit may divide a first image frame and a second image frame generated in the recording of the external image into pluralities of regions to calculate a moving direction and a distance of each of the plurality of regions of the second image frame corresponding to each of the plurality of regions of the first image frame, and determine a region in which the calculated moving direction or distance is the same as a preset moving direction or distance as a background region, and determine a region different from the background region as an object region.

The region determination unit may generate the background model based on a result determined as the background with respect to each region of the second image frame and color information of pixels of the region, and generate the object model by mixing a result determined as the object region and the color information of the pixels of the region with a uniform distribution.

The region determination unit may determine a background pixel and an object pixel with respect to each pixel of the second image frame based on the background model, the object model, and information of surrounding pixels.

The region determination unit may generate an object mask including only information of the object pixel, and the posture estimation unit may estimate the posture based on the generated object mask.

The body part model may be at least one of a static edge model, a region model, and a dynamic edge model.

The dynamic edge model may be generated from the body parts of the object determined based on the first image frame and the second image frame generated in the recording of the external image.

The posture estimation unit may output the determined posture as at least one of location information, scale information, and angle information of the body parts.

The region determination unit may predict an object region and a background region based on the determined posture.

According to an aspect of an exemplary embodiment, there is provided a method of controlling an imaging apparatus. The method may include: dividing an imaged previous image frame and current image frame into pluralities of regions; calculating a moving direction and a distance of each of the plurality of regions of the current image frame corresponding to each of the plurality of regions of the previous image frame; determining a background and an object by applying a preset background model and object model based on the calculated moving direction and distance; and determining body parts of the determined object based on a body part model, and determining a posture of the object by combining the determined body parts.

The calculating of the moving direction and the distance may include calculating a moving direction and a distance of each pixel in each of the plurality of regions of the current image frame corresponding to each pixel in each of the plurality of regions of the previous image frame, and determining the moving direction and the distance of the region of the current image frame by averaging the calculated moving direction and distance of each pixel.

The method may further include dividing a first image frame and a second image frame generated in recording into pluralities of regions; calculating a moving direction and a distance of each of the plurality of regions of the second image frame corresponding to each of the plurality of regions of the first image frame; and determining a region in which the calculated moving direction or distance is the same as a preset moving direction or distance as a background region, and determining a region different from the background region as an object region.

The method may further include generating the background model based on a result determined as the background region with respect to each region of the second image frame and color information of pixels of the region, and generating the object model by mixing a result determined as the object region and the color information of the pixels of the region with a uniform distribution.

The method may further including determining a background pixel and an object pixel with respect to each pixel of the second image frame based on the background model, the object model, and information of surrounding pixels.

The method may further include generating object masks including only information of the object pixel, and estimating the posture based on the generated object mask.

The body part model may be at least one of a static edge model, a region model, and a dynamic edge model.

The dynamic edge model may be generated from the body parts of the object determined based on the first image frame and second image frame generated in imaging.

The method may further include outputting the determined posture as at least one of a location, a scale, and angle information of the body part.

The determining of the background and the object may include predicting an object region and a background region based on the determined posture.

The imaging apparatus and a control method thereof can divide a background and an object of an image frame in various environments and determine a posture of the object.

According to an aspect of an exemplary embodiment, there is provided a method of controlling imaging apparatus, the method includes: calculating a moving direction and a distance of each of a plurality of regions of a current image frame corresponding to each of a plurality of regions of a previous image frame; determining, based on the calculated moving direction and distance, a background and an object by applying a preset background model and object model; determining body parts of the determined object based on a body part model; and determining a posture of the object based on the determined body parts.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 3 is a view explaining a process of dividing a background region and an object region of an image frame according to an exemplary embodiment;

FIG. 5 is a view illustrating an object model according to an exemplary embodiment;

FIG. 7 is a view explaining a process of generating an object mask according to an exemplary embodiment;

FIG. 8 is a view illustrating a body part model according to an exemplary embodiment;

FIG. 11 is a view illustrating a result according to an exemplary embodiment.

DETAILED DESCRIPTION OF THE EXEMPLARY EMBODIMENTS

Figure 1:
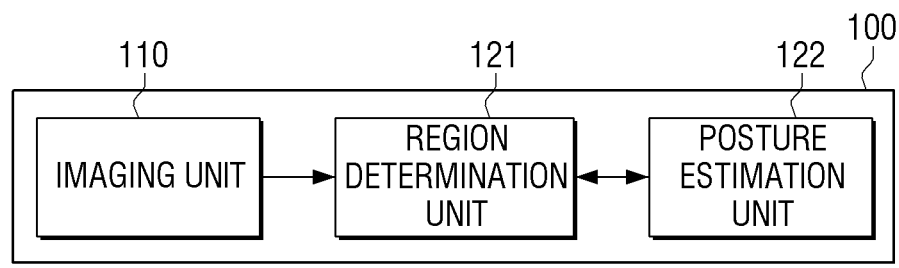
FIG. 1 is a block diagram illustrating an imaging apparatus according to an exemplary embodiment.

Hereinafter, exemplary embodiments will be described in more detail with reference to the accompanying drawings.

In the following description, the same reference numerals are used for the same elements when they are depicted in different drawings. The matters described in the description, such as detailed construction and elements, are provided to assist in a comprehensive understanding of the exemplary embodiments. Thus, it is apparent that the exemplary embodiments can be carried out without those specifically described matters. Also, functions or elements known in the related art are not described in detail since they would obscure the exemplary embodiments with unnecessary detail.

FIG. 1 is a block diagram illustrating an imaging apparatus according to an exemplary embodiment. Referring to FIG. 1, an imaging apparatus 100 includes an imaging unit 110, a region determination unit 121, and a posture estimation unit 122.

The imaging unit 110 images an external image. In some cases, a plurality of imaging units 110 may be implemented. The imaging unit 110 may include an auxiliary light source (example, a flash) configured to provide an amount of light required for an imaging operation.

The region determination unit 121 divides an imaged or recorded previous image frame and current image frame into pluralities of regions. The region determination unit 121 calculates a moving direction and a distance of each region of the current image frame corresponding to each region of the previous image frame. The region determination unit 121 compares pixels included in one region of the current image frame with pixels included in one region of the previous image frame corresponding to the region of the current image frame to calculate moving directions and distances. The region determination unit 121 averages the calculated moving directions and distances of the pixels to calculate the moving direction and the distance of the region of the current image frame.

The region determination unit 121 may allow a preset background model and object model to correspond to the current image frame based on the calculated moving direction and distance information. The region determination unit 121 determines a background and an object by applying a background model corresponding to one region of the current image frame. The region determination unit 121 may generate an object mask including only information of pixels corresponding to the object. That is, the object mask may be image information in which only information of the object is included, and the background is represented as 0 (zero). The background model, the object model, and the object mask may be updated by adding information of the current image frame.

When the object is determined, the posture estimation unit 122 determines a body part of the determined object based on a body part module. For example, the body part model may be at least one of a static edge model, a region model, and a dynamic edge model. The static edge model is a model including contour information of an average person. The region model is a model including skin information or region information of an average person. The dynamic model is a model including contour information of an object existing in an imaged image. The static edge model and the region model may be pre-stored in the imaging apparatus 100, or may be received from an external apparatus or device.

The dynamic edge model may be generated after signal processing is performed on some frames. For example, the posture estimation unit 122 may determine body parts with respect to primary two frames only using the static edge model and the region model, and generate the dynamic edge model using the determined body parts. The posture estimation unit 122 may determine the body parts using the static edge model, the region model, and the dynamic edge with respect to a third frame or more. The dynamic edge model may be updated by adding body part information of an object of the current image frame.

In one example, the body parts may be divided into a face, a body, a left upper arm, a left lower arm, a right upper arm, a right lower arm, a left upper leg, a left lower leg, a right upper leg, and a right lower leg.

The posture estimation unit 122 may determine the body parts by a method of scanning a portion which coincides with a current image frame by using the body part model. The posture estimation unit 122 can reduce a scan region using the generated object mask to reduce a processing time and load while increasing a body part matching probability.

The posture estimation unit 122 combines the determined body parts to determine a posture of the object. The posture estimation unit may determine the posture of the object using the body parts determined by the body part model and basic body part location information. For example, a face and body of the object may be determined using the body part model. The posture estimation unit 122 may combine the body parts to determine the posture of the object using the basic body part location information, such as information in which the face is located above the body or information in which the face is located opposite legs.

The posture estimation unit 122 may output the determined posture of the object as at least one of location information, scale information, and angle information of the body part. Further, the posture estimation part 122 may output the determined posture information of the object to the region determination unit 121. The region determination unit 121 may predict an object image and a background region of a next frame using the posture information.

Figure 2:
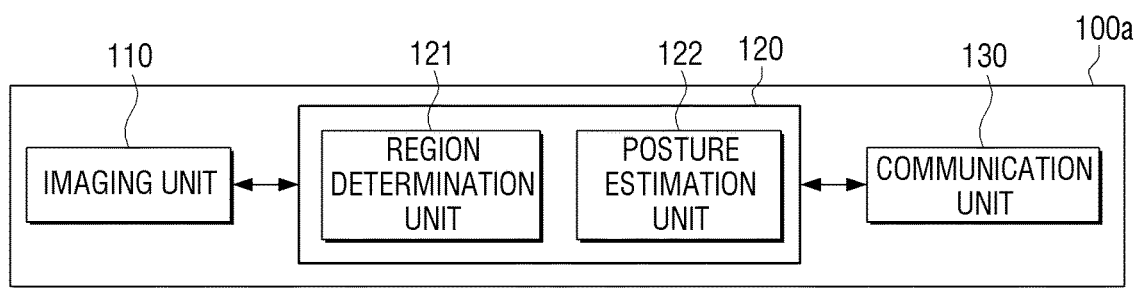
FIG. 2 is a block diagram illustrating an imaging apparatus according to another exemplary embodiment.

FIG. 2 is a block diagram illustrating an imaging apparatus according to an exemplary embodiment. Referring to FIG. 2, an imaging apparatus 100a may include an imaging unit 110, a controller 120, and a communication unit 130. The controller 120 may include a region determination unit and a posture estimation unit 122. In FIG. 2, the region determination unit 121 and the posture estimation unit 122 are included in the controller 120, but the region determination unit 121 and the posture estimation unit 122 may be implemented with a separate configuration, or with a configuration included in a separate image signal processor (not shown). Further, the region determination unit 121 and the posture estimation unit 122 may be implemented with a hardware configuration or a software module.

The imaging unit 110 images or records an external image. The controller 120 divides an image frame generated in the imaging of the external image into an object and a background, and determines a posture of the object. The operation of the controller 120 is the same as that described in FIG. 1, and thus detailed description thereof will be omitted.

The communication unit 130 may perform communication with a server (not shown) and transmit or receive a body part model through control of the controller 120. For example, the communication unit 130 may receive a static edge model and a region model from the server. The static edge model and the region model may be used to determine body parts. The communication unit 130 may transmit a dynamic edge model generated in each frame to the server, and the server may receive the dynamic edge model and update the dynamic edge model, or update the static edge model and the region model. As described above, the static edge model may be a contour line of an average body of persons, and the region model may be texture of an average body of persons. Therefore, the static edge model and the region model are generated using information as much as possible to approximate an actual average.

The communication unit 130 may transmit and receive a background model and an object model to and from a server. The communication unit 130 may receive a uniform distribution for generating the object model. The uniform distribution may be has a uniform frequency value with respect to all color values, and is used to generate the object model by being mixed with color information in pixel information of an object. Since the frequency value of the uniform distribution may be appropriately set, when an initially set frequency value is changed, the uniform distribution may be received from the server through the communication unit 130.

The block diagram of the imaging apparatus has been described until now. Hereinafter, a processing of dividing a background and an object in a frame and a process of determining a posture of the object will be described.

FIG. 3 is a view illustrating a processing of dividing a background and an object of an image frame according to an exemplary embodiment.

Referring to (a) of FIG. 3, a person 61, a building A 63, a building B 65, and a building C 67 are illustrated in one image frame. The person 61 is moving to the left, and may be an object imaged through an imaging unit. The building A 63, the building B 65, and the building C 67 may be a background. The person 61 moves to the left, and the building A 63, the building B 65, and the building C 67 are fixed. However, when an angle of the imaging unit is changed according to the movement of the person 61, the locations of the person 61, the building A 63, the building B 65, and the building C 67 change in a next frame.

Referring to (b) of FIG. 3, a next frame including the person 61, the building A 63, the building B 65, the building C 67, and a building D 69 are illustrated. In general, since it tends to fix the angle of the imaging unit based on an object, even when the person 61 moves to the left, the person 61 may be located approximately in a central region of the frame. Therefore, the building A 63, the building B 65, and the building C 67 relatively move to the right, and a new building D 69 may appear in the left region of the frame.

The region determination unit divides the previous frame and the current frame into pluralities of regions. The region determination unit may determine a moving direction and a distance of a corresponding pixel of the previous frame based on a region of the current frame. Referring to (b) of FIG. 3, the person 61 of the current frame 12 moves by one space to the left as compared to the previous frame 11. The building A 63, the building B 65, and the building C of the current frame 12 move by one space to the left as compared to the previous frame 11. That this, a person region 31 moves to the left and the remaining background moves to the right. As illustrated in (b) of FIG. 3, the person region 61 is two regions, and most regions in one frame are a background region.

That is, a preset moving direction and distance of a region determined as the background region may be a moving direction and a distance of a uniform trend represented in the most regions. Regions having remarkably difference from the moving direction and distance represented by the most regions may be determined the object region.

The region determination unit may determine the person region 31 as the object region, and other regions as the background region. In one exemplary embodiment, an epipolar constraint method for calculating the moving direction and distance of a region, and determining the object region and the background region may be used. There is no information for a current image frame at a point of time when an initial imaging starts. Therefore, after a first frame and a second frame are imaged, the region determination unit may perform the above-described process on the first frame using the second frame. Alternatively, the region determination unit may determine the object region and the background region of the second frame by determining a difference from the first frame.

The region determination unit determines the object region and the background region, and generates an object model and a background model of each region.

Figure 4:
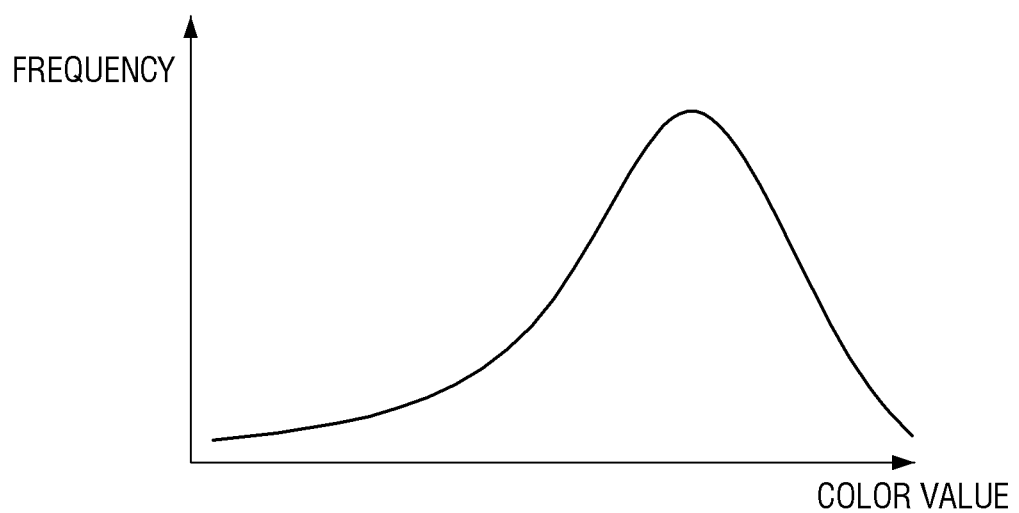
FIG. 4 is a view illustrating a background model according to an exemplary embodiment.

FIG. 4 is a view illustrating a background model according to an exemplary embodiment.

Referring to FIG. 4, a background model in which an x-axis indicates a color value, and a y-axis indicates a frequency, with respect to one color, is illustrated. The background model is represented by accumulating color information of each pixel included in one region of a current frame. Each pixel may be represented with a color value of red (R), a color value of green (G), and a color value of blue (B). For example, black may be represented with 0 (zero) of R, 0 (zero) of G, and 0 (zero) of B, and white may be represented with 255 of R, 255 of G, and 255 of B. Further, red may be represented with 255 of R, 0 (zero) of G, and 0 (zero) of B. Therefore, a graph representing color values of R of pixels in one region, a graph representing color values of G of the pixels of the region, and a graph representing color values of B of the pixels of the region may be generated. The graphs of R, G, and B are represented at one to generate a graph of three-dimensional (3D) form. FIG. 4 illustrates a graph of one color among R, G, and B. It is assumed that the graph in FIG. 4 is the graph of R, the color values of 0 to 255 may be represented, a frequency at a color value of 10 is 10, and a frequency at a color value of 100 is 100. At this time, the background model represents that pixels in which R is 10 is 10 in one region, and pixels in which R is 100 is 100 in the one region 100.

The region determination unit generates background models with respect to all regions. The region determination unit divides the back ground region and the object region to generate the background model in a form as illustrated in FIG. 4 with respect to a region in which only a background exists, and to generate a background model in a form in which there is almost no a frequency with respect to a region in which only an object exists.

The background model is generated through the above-described method using primary first and second frames. The generated background model is updated from a next frame and used to determine the object and background of each frame.

FIG. 5 is a view illustrating an object model according to an exemplary embodiment.

Referring to (a) of FIG. 5, color information in which an x-axis indicates a color value, and a y-axis indicates a frequency, with respect to one color, is illustrated. The color information of the object is generated using pixels of an object region, and a detailed process is similar to the background model described in FIG. 4.

Referring to (b) of FIG. 5, a uniform distribution is illustrated. The uniform distribution may be a graph having a uniform frequency with respect to all color values. In general, an object may have various colors, and thus an object model may be generated by mixing the uniform distribution having a constant frequency with all the color values with the color information.

Referring to (c) of FIG. 5, an object model in which color information of an object and a uniform distribution are mixed with respect to one region is illustrated. In general, there are many cases in which an object includes various colors. When pixels are determined using the object model in which the color information and the uniform distribution are mixed by considering this point, an object may be more accurately determined. The object model is also generated with respect to all regions of one frame. That is, object information having the same form as the uniform distribution may be generated since there is no color information of an object with respect to a region in which only a background exists.

Like the background model, the object model is generated using primary first and second frames. The generated object model is updated from a third frame, and used to determine a background and an object every frame.

Figure 6:
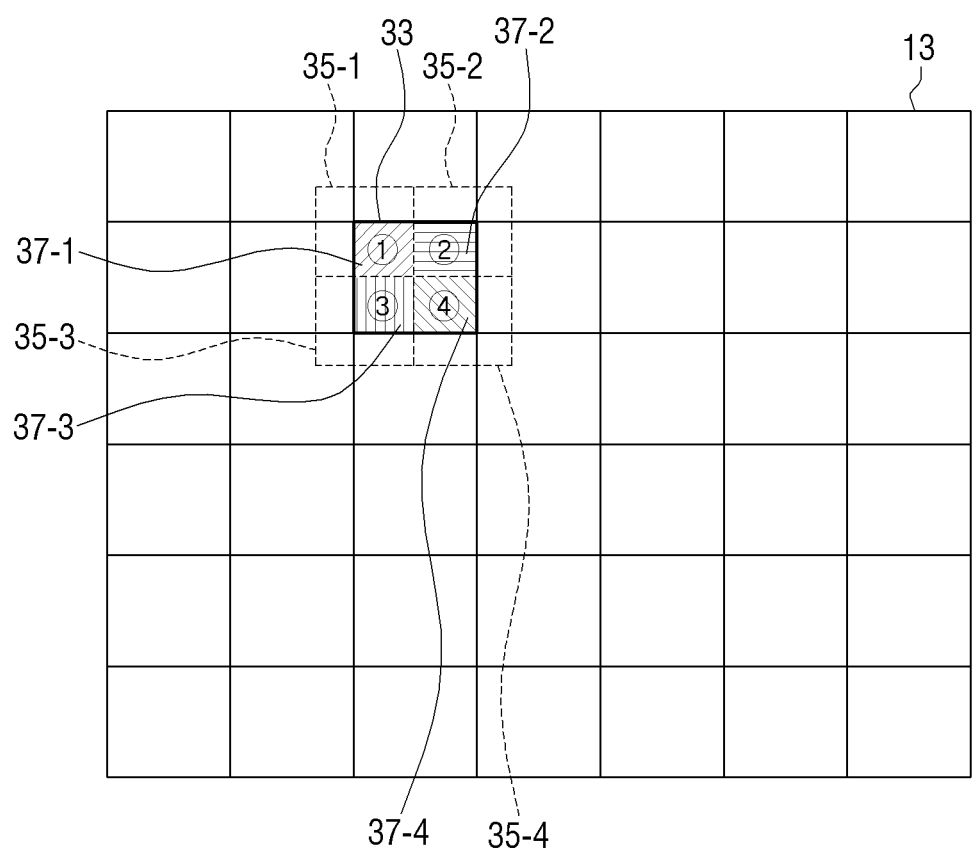
FIG. 6 is a view explaining a process of applying a background model and an object model according to an exemplary embodiment.

FIG. 6 is a view explaining a process of applying a background model and an object model according to an exemplary embodiment.

Referring to FIG. 6, a current frame 13 divided into a plurality of regions is illustrated. To apply an object model and a background model generated in a previous frame to the current frame 13, a moving direction of the current frame has to be considered by comparing the current frame 13 with the previous frame. One region 33 of the current frame will be described. A region indicated by a solid line represents a region of the current frame 13, and regions 35-1, 35-2, 35-3, and 35-4 represent regions of the previous frame. As illustrated in FIG. 6, the one region 33 of the current frame partially corresponds to four regions 35-1, 35-2, 35-3, and 35-4 of the previous frame. The regions of the previous frame corresponding to the current frame may be determined by calculating a moving direction and a distance for each of the plurality of regions.

For example, it is assumed that the one region 33 of the current frame corresponds to a first region 35-1 of the previous frame by 50% (see 37-1), a second region 35-2 of the previous frame by 20% (see 37-2), a third region 35-3 of the previous frame by 20% (see 37-3), and a fourth region 35-4 of the previous frame by 10% (see 37-4). At this time, the region determination unit may determinate an object and a background by using a model in which a model of the first region 35-1 is applied to the one region 33 of the current frame by 50%, a model of the second 35-2 is applied to the one region 33 of the current frame by 20%, a model of the third region 35-3 is applied to the one region 33 of the current frame by 20%, and a model of the fourth region 35-4 is applied to the one region 33 of the current frame by 10%. That is, the region determination unit may update the background model and the object model, in which a ratio corresponding to the previous frame is applied to the region of the current region, and compare the updated background model and object model with pixels of the region to determine object pixels and background pixels. The above-described process may be performed on all the regions of the frame.

In this way, the background model and the object model are updated by repeatedly performing the above-described process every frame, and a background and an object for each pixel of the current frame are determined.

The region determination unit may determine a background and an object further using additional information since an error is likely to occur when the background and the object are determined using only information of the pixels.

FIG. 7 is a view explaining a process of generating an object mask according to an exemplary embodiment.

Referring to (a) of FIG. 7, a person 71 corresponding to an object exists in a current frame 14. It is determined whether each pixel is an object or a background using the background model and the object model described in FIG. 6. When the determining with respect to one pixel 38 of the person is performed, the region determination unit determines likelihood of the background model and object model of the one pixel 38. The region determination unit considers a relationship between the one pixel 38 and surrounding pixels 39a, 39b, 38c, and 39d. In general, probability in which object pixels exist is high around the object pixels and probability in which surrounding pixels exist is high around the surrounding pixels. Therefore, the region determination unit determines the one pixel 38 as an object pixel when the likelihood to the object model with respect to the one pixel 38 is high, and the surrounding pixels are determined as the object pixels.

At this time, an error may occur in a boundary portion between the object and the background. The region determination unit may determine an object more accurately through optimization by graph-cut. The graph-cut method is widely used, and thus detailed description thereof will be omitted. The region determination unit may determine the object and generate an object mask.

Motions of the object and background estimated in a previous process are corrected using a region determination result obtained by the graph-cut, and thus the model is corrected in a next process to obtain the improved region determination result.

Referring to (b) of FIG. 7, a generated object mask 15 is illustrated. The object mask 15 may be image information in which only object information is included, and a background region is processed as 0 (zero). Therefore, the generated object mask 15 is generated as an image in which information for a person 73 as an object is included, and the remaining portion has a value of 0 (zero). The object mask 15 includes only the object information, and thus the object mask may be used to determine a posture of the object. That is, the posture determination of the object may be performed by a method of scanning an image frame and finding a portion of the image frame matching a body part model. That is, since the object mask 15 includes only the object information, only the object portion can be scanned to be advantageous of a signal processing load or time. Further, the background information is 0 (zero), and thus probability for an error is reduced. Movement of an object in consecutive frames is continuously. Therefore, it is possible to predict a background region, an object region, and a posture of the object in a next frame using the object mask 15.

In this way, the posture estimation unit determines a posture of an object using the generated object mask and a body part model.

FIG. 8 is a view illustrating a body part model according to an exemplary embodiment. In an exemplary embodiment, a body part model includes a static edge model, a region model, and a dynamic edge model. The body part model may be implemented with 10 body parts such as a face, a body, a left upper arm, a left lower arm, a right upper arm, a right lower arm, a left upper leg, a left lower leg, a right upper leg, and a right lower leg.

Referring to (a) of FIG. 8, a static edge model of a body 81 is illustrated. The static edge model may be an image including contour information on the basis of an average person. The posture estimation unit may scan a current frame, and detect a portion most similar to the static edge model of the body 81 to be recognized as a body. The posture estimation unit may perform a search operation using the object mask to reduce a range of the scanned region and an error. However, the static edge model includes only contour information, and thus the region model is used with the static edge model to detect the body part more accurately.

Referring to (b) of FIG. 8, a region model of a body 83 is illustrated. The region model may be an image including volume information, texture information, or region information on the basis of an average person. The posture estimation unit scans a current frame, and detects a portion most similar to the region model of the body 83 to be recognized as a body. The region model may be used with the static edge model. For example, the static edge model of an arm may include information similar to parallel lines. Therefore, when the posture estimation unit scans the current frame using only the static edge model of the arm to detect parallel lines in the frame, the region estimation unit may determine the detected portion as an arm portion. Therefore, the posture estimation unit may perform the scan operation simultaneously using the static edge model and the region model to reduce an error rate of body part detection. However, the static edge model and the region model are model generated based on an average person, and thus when the body of the current frame is considerably different from the body of the average person, an error considerably occurs in the body part detection. Therefore, the region estimation unit may generate a dynamic edge model from an object of the current frame, and the posture estimation unit may detect the body part more accurately using the generated dynamic edge model.

Referring to (c) of FIG. 8, a dynamic edge model of a body 85 is illustrated. The dynamic edge model may be an image including contour information on the basis of an object in the current frame. There is no dynamic edge model in a point of time when first imaging is performed. Therefore, the posture estimation unit detects a body part in a first frame and a second frame, the posture estimation unit detects a body part only using the static edge model and the region model. At this time, the region determination unit may generate the dynamic edge model from the determined object. Therefore, the posture estimation unit may detect the body part using the static edge model, the region model, and the dynamic edge model when the posture estimation unit detects the body part in subsequent frames.

In some cases, the imaging apparatus may receive the static edge model and the region model from a server. Alternatively, the imaging apparatus may transmit the generated dynamic edge model to the server, and the server may update the dynamic edge model and transmit the updated dynamic edge model to the imaging apparatus.

The posture estimation unit determines and detects each body part of an object using the body part model. The posture estimation unit determines a posture of an object by combining the detected body parts.

Figure 9:
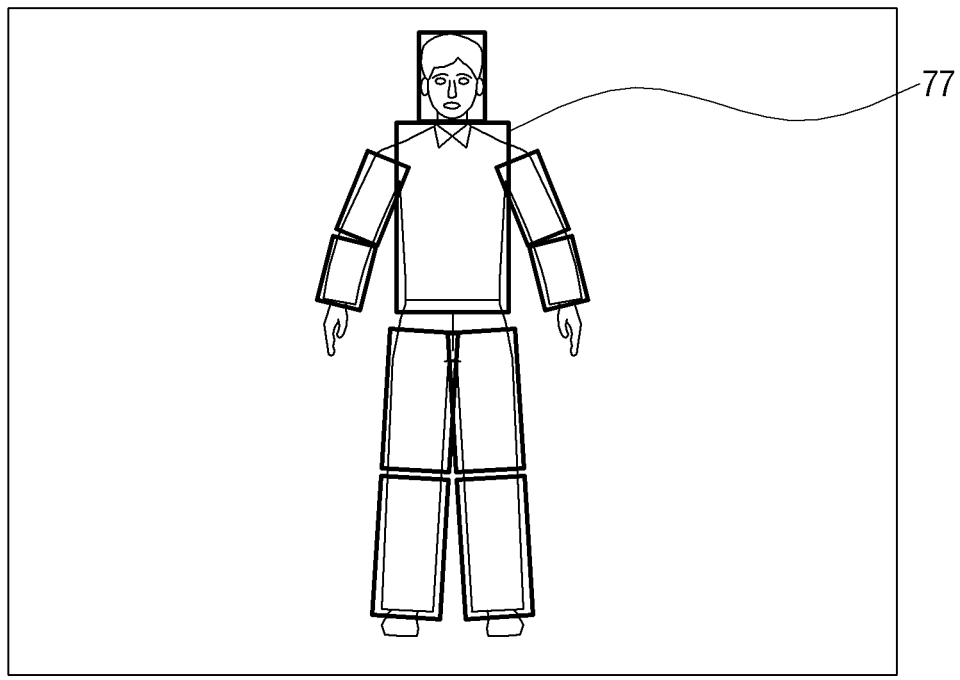
FIG. 9 is a view explaining a process of determining a posture of an object according to an exemplary embodiment.

FIG. 9 is a view explaining a process of determining a posture of an object according to an exemplary embodiment.

Referring to FIG. 9, a posture of an object 77 determined by combining detected body parts is illustrated. The posture estimate unit determines each body part based on a body part model in a current frame. In an exemplary embodiment, the posture estimation unit determines a face, a body, a left upper arm, a left lower arm, a right upper arm, a right lower arm, a left upper leg, a left lower leg, a right upper leg, and a right lower leg. At this time, the posture estimation unit may determine and search a search region of each body part using basic information and region information to detect each body part efficiently. The basic information may be information in which a face is located above a body or opposite legs, information in which arms are located on the left or right of the body, and the like.

The posture estimation unit searches a certain region in a frame using the body part model and calculates a response value. The posture estimation unit determines an optimal posture using a relationship between the calculated response value and each body part. In an exemplary embodiment, the optimal posture may be determined using a belief propagation method. The determined posture may be output as at least one of location information, scale information, and angle information of the body part. The determination result of the posture may be used to predict the object region and the background region. Further, the determination result of the posture may be used to update the dynamic edge model. Speed of each body part may be estimated by detecting a difference between a currently estimated location and an estimated location in a previous frame using the posture determination result.

Figure 10:
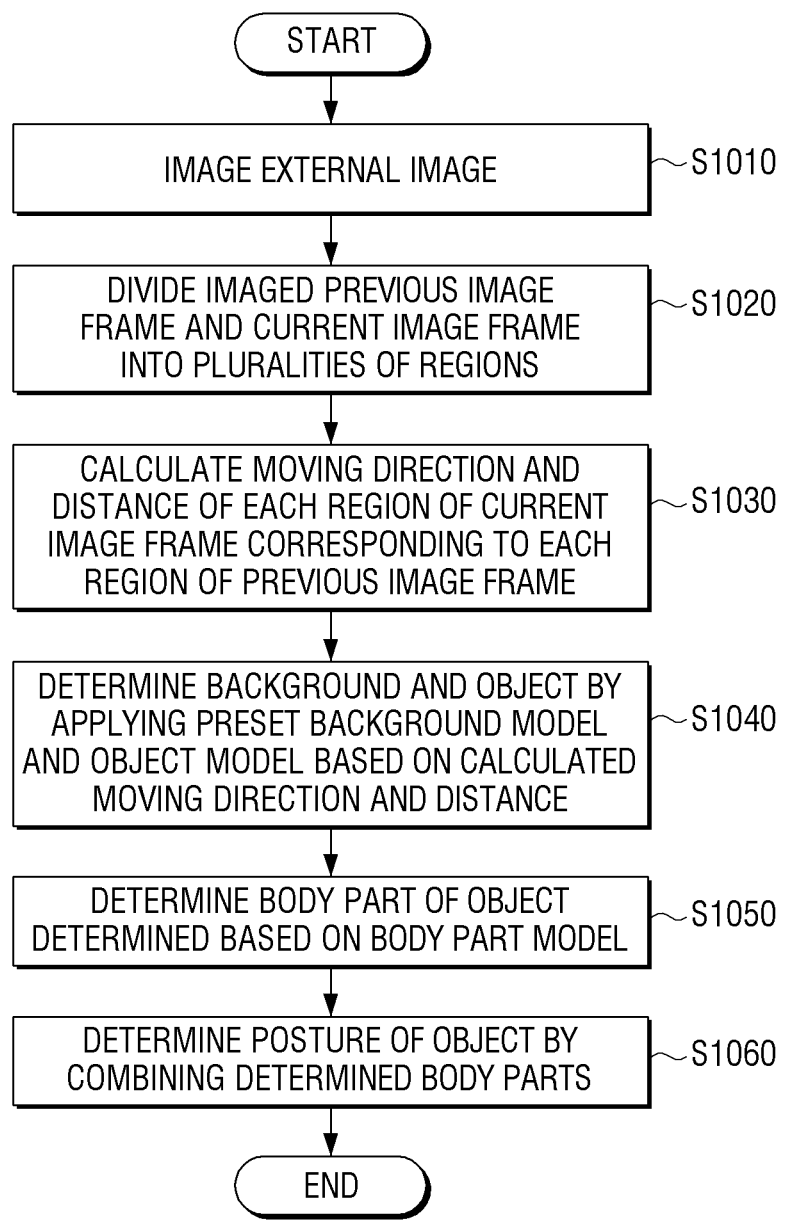
FIG. 10 is a flowchart illustrating a control method of an imaging apparatus according to an exemplary embodiment.

FIG. 10 is a flowchart illustrating a control method of an imaging apparatus according to an exemplary embodiment.

Referring to FIG. 10, the imaging apparatus images an external image (operation S1010). The imaging apparatus divides an imaged previous image frame and current image frame into pluralities of regions (operation S1020). The imaging apparatus calculates a moving direction and a distance of each region of current image frame corresponding to each region of previous image frame (operation S1030). The calculation of the moving direction and the distance may include calculating a moving direction and a distance of each pixel in a region of the current image frame corresponding to each pixel in a region of the previous image frame, and calculating the moving direction and the distance in the region of the current image frame by averaging the calculated moving direction and distance of each pixel.

The imaging apparatus determines a background and an object by applying a preset background model and object model based on the calculated moving direction and distance (operation S1040). The imaging apparatus determines body parts of the object determined based on the body part model (operation S1050). The imaging apparatus combines the determined body parts to determine a posture of the object (operation S1060). A detailed process is described above, and thus detailed description thereof will be omitted.

When initial imaging starts, the imaging apparatus may divide a first image frame and a second image frame generated in the imaging into pluralities of regions. The imaging apparatus may calculate a moving direction and a distance of each region of the second image frame corresponding to each region of the first image frame. The imaging apparatus may determine a region in which the calculated moving direction or distance is the same as a preset moving direction or distance as a background region, and a region different from the background as an object region. The preset moving direction or distance may be a moving directions or distance determined in a plurality of regions.

When the first imaging starts, the imaging apparatus may generate a background model based on a result determined as the background region with respect to each region of the second image frame and color information of pixels of each region. Further, the imaging apparatus may generate an object model by mixing the result determined as the object region and the color information of the pixels of the region with a uniform distribution. The imaging apparatus may determine a background pixel and an object pixel based on a background model and an object model generated with respected to each pixel of the second image frame, and information of surrounding pixels. A method of determining a background pixel and an object pixel with respect to subsequent frames may be performed similarly to the above-described method.

The imaging apparatus may generate a dynamic edge model from the body part of the object determined based on the first image frame and second image frame generated in the imaging. The generated dynamic edge model may be updated according to change in an image frame.

The imaging apparatus may generate an object mask including only information for the object pixel, and estimate a posture based on the generated object mask.

FIG. 11 is a view illustrating a result according to an exemplary embodiment.

Referring to view (1) of FIG. 11, an object mask generated according to various exemplary embodiments is illustrated. The imaging apparatus divides a current frame and a previous frame into pluralities of regions, and calculates a moving direction and a distance for each region. The imaging apparatus determines a background and an object by applying a background model and an object model based on the calculated moving direction and distance. The imaging apparatus may optimize an object using graph-cut and delete background information to generate the object mask in which only an object is accurately represented as illustrated in view (1) of FIG. 11. The generated object mask may be used to determine a posture of the object.

View (2) of FIG. 11 is a view illustrating a determined posture of an object according to various exemplary embodiments. The imaging apparatus may determine body parts using a plurality of body part models and an object mask, and combine the determined body parts to determine a posture of an object. The posture result of the object may be used to predict an object region and a background region. That is, the posture result of the object may be used to determine a background and an object.

The control methods of an imaging apparatus according to the above-described exemplary embodiments may be implemented in a program to be provided to the imaging apparatus.

In one example, a non-transitory computer-recordable medium, in which a program for performing dividing an imaged previous image frame and current image frame into pluralities of regions; calculating a moving direction and a distance of each of the plurality of regions of the current image frame corresponding to each of the plurality of regions of the previous image frame; determining a background and an object by applying a preset background model and object model based on the calculated moving direction and distance; and determining body parts of the determined object based on a body part model, and determining a posture of the object by combining the determined body parts of the object is stored, may be provided.

The non-transitory computer-recordable medium may be a medium configured to temporarily store data such as a register, a cache, or a memory and an apparatus-readable medium configured to semi-permanently store data. Specifically, the above-described applications or programs may be stored and provided in the non-transitory apparatus-readable medium such as a compact disc (CD), a digital versatile disc (DVD), a hard disc, a Blu-ray disc, a universal serial bus (USB), a memory card, a read only memory (ROM), and the like.

Although a bus has not been shown in the block diagram illustrating the display apparatus, communication between the components in the display apparatus may be performed through the bus. Further, a CPU or a processor configured to perform the above-described operations, such as a microprocessor, may be further included in the device.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An imaging apparatus comprising:
an imaging unit; and
a processor configured to:
control the imaging unit to generate image frames by capturing an object,
identify a previous image frame and a current image frame as a plurality of regions, respectively,
obtain a moving direction and a moving distance of each of the plurality of regions included in the current image frame with respect to the plurality of regions included in the previous image frame,
identify a background and the object in the current image frame based on the obtained moving direction and moving distance,
identify body parts of the object by scanning the current image frame using an object mask on a body part model, and
identify a posture of the object based on the body parts,
wherein the body part model comprises a static edge model, a region model, and a dynamic edge model, and
wherein the processor identifies the body parts with respect to at least two frames based on the static edge model, and the region model, obtains the dynamic edge model using the identified body parts, and identifies the body parts based on the static edge model, the region model, and the dynamic edge model with respect to a next frame, wherein the static edge model includes contour information of an average person,
wherein the region model includes at least one of skin information or region information of the average person, and
wherein the object mask is obtained based on a likelihood of a pixel with a background model and an object model using a graph-cut method.

2. The imaging apparatus as claimed in claim 1, wherein the processor is further configured to calculate the moving direction and the moving distance of each pixel in each region of the current image frame corresponding to each pixel of each region of the previous image frame, and calculate the moving direction and the moving distance of each region of the current image frame by averaging the calculated moving direction and distance of each pixel.

3. The imaging apparatus as claimed in claim 1, wherein the processor is further configured to:
identify a region in which the calculated moving direction or distance is the same as a predetermined moving direction or distance as a background region, and identify a region different from the background region as an object region.

4. The imaging apparatus as claimed in claim 3, wherein the processor is further configured to:
generate the background model based on a result identified as the background region with respect to each region of a second image frame and color information of pixels of the region, and
generate the object model by mixing a result identified as the object region and the color information of the pixels of the region with a uniform distribution.

5. The imaging apparatus as claimed in claim 4, wherein the processor is further configured to identify a background pixel and an object pixel with respect to each pixel of the second image frame based on the background model, the object model, and information of surrounding pixels.

6. The imaging apparatus as claimed in claim 5, wherein the processor is further configured to:
generate the object mask including only information of the object pixel, and
estimate the posture based on the generated object mask.

7. The imaging apparatus as claimed in claim 1, wherein the processor is further configured to obtain at least one of location information, scale information, angle information, and speed information of each of the identified body parts.

8. The imaging apparatus as claimed in claim 1, wherein the processor is further configured to predict an object region and a background region based on the identified posture.

9. A method of controlling imaging apparatus, the method comprising:
identifying a previous image frame and a current image frame as a plurality of regions, respectively;

obtaining a moving direction and a moving distance of each of the plurality of regions included the current image frame with respect to the plurality of regions included the previous image frame;

identifying a background and an object in the current image frame based on the obtained moving direction and moving distance;

identifying body parts of the object by scanning the current image frame using an object mask on a body part model; and identifying a posture of the object based on the body parts, wherein the body part model comprises a static edge model, a region model, and a dynamic edge model, and wherein the method further comprises identifying the body parts with respect to at least two frames based on the static edge model, and the region model, obtaining the dynamic edge model using the identified body parts, and identifies the body parts based on the static edge model, the region model, and the dynamic edge model with respect to a next frame, wherein the static edge model includes contour information of an average person, wherein the region model includes at least one of skin information or region information of the average person, and wherein the object mask is obtained based on a likelihood of a pixel with a background model and an object model using a graph-cut method.

10. The method as claimed in claim 9, wherein the obtaining of the moving direction and the moving distance comprises:

calculating the moving direction and the moving distance of each pixel in each of the plurality of regions of the current image frame corresponding to each pixel in each of the plurality of regions of the previous image frame; and determining the moving direction and the moving distance of the region of the current image frame by averaging the calculated moving direction and distance of each pixel.

11. The method as claimed in claim 9, further comprising:

identifying a region in which the moving direction or distance is the same as a predetermined moving direction or distance as a background region, and determining a region different from the background region as an object region.

12. The method as claimed in claim 11, further comprising:

generating the background model based on a result identified as the background region with respect to each region of a second image frame and color information of pixels of the region; and generating the object model by mixing a result identified as the object region and the color information of the pixels of the region with a uniform distribution.

13. The method as claimed in claim 12, further comprising determining a background pixel and an object pixel with respect to each pixel of the second image frame based on the background model, the object model, and information of surrounding pixels.

14. The method as claimed in claim 13, further comprising:

generating object masks including only information of the object pixel; and estimating the posture based on the generated object mask.

15. The method as claimed in claim 9, further comprising obtaining at least one of location information, scale information, angle information, and speed information of each of the identified body parts.

16. A non-transitory computer readable medium comprising executable instructions for performing the method of claim 9.

17. The imaging apparatus as claimed in claim 1, wherein the processor is further configured to determine the posture of the object based on a relationship between response information of each a plurality of search regions for the dynamic edge model and the body parts of the object.

* * * * *